United States Patent
Novicky

(10) Patent No.: US 7,098,282 B2
(45) Date of Patent: Aug. 29, 2006

(54) FLUOROSULFONE-SILICONE HYDROGEL, RGP CONTACT LENSES, OPTICAL MEDICAL DEVICES AND COMPOSITIONS THEREOF

(76) Inventor: Nick Novicky, #20, 1410—40 Avenue, N.E., Calgary, Alberta (CA) T2E 6L1

( * ) Notice: Subject to any disclaimer, the term of this patent is extended or adjusted under 35 U.S.C. 154(b) by 273 days.

(21) Appl. No.: 10/654,906

(22) Filed: Sep. 5, 2003

(65) Prior Publication Data

US 2005/0176907 A1    Aug. 11, 2005

(30) Foreign Application Priority Data

Mar. 5, 2003    (CA) .................................. 2421256

(51) Int. Cl.
*C08F 14/18*    (2006.01)
(52) U.S. Cl. ...................... 526/243; 526/279
(58) Field of Classification Search ................ 526/243, 526/279
See application file for complete search history.

(56) References Cited

U.S. PATENT DOCUMENTS

| | | | |
|---|---|---|---|
| 4,095,877 A | 6/1978 | Stoy et al. | |
| 4,165,158 A | 8/1979 | Travnicek | |
| 4,711,943 A | 12/1987 | Harvey, III | |
| 4,748,224 A | 5/1988 | Novicky | |
| 4,861,850 A | 8/1989 | Novicky | |
| 5,079,319 A * | 1/1992 | Mueller | 526/238.23 |
| 5,463,005 A * | 10/1995 | Desmarteau | 526/240 |
| 5,789,461 A | 8/1998 | Nicolson et al. | |
| 6,107,015 A * | 8/2000 | Anderson et al. | 430/525 |
| 6,380,336 B1 * | 4/2002 | Soane et al. | 526/245 |
| 6,559,198 B1 * | 5/2003 | Novicky | 523/106 |

* cited by examiner

*Primary Examiner*—Margaret G. Moore
(74) *Attorney, Agent, or Firm*—Stevens, Davis, Miller & Mosher, L.L.P.

(57) ABSTRACT

Highly comfortable oxygen permeable and hydrophilic contact lenses are manufactured from a copolymer of an ethylenically unsaturated novel monomers Bis(perfluoroalkylsulfonyl)-amidoethyl methacrylate, Bis(alkylsulfonyl) amidoethyl methacrylate, (N-alkylsulfonyl-N'-perfluoroalkylsulfonyl)amidoethyl methacrylate and organosilicone ester monomers of acrylic and methacrylic acid and ethylenically unsaturated ester monomers of methacrylic acid having alkyl hydroxy groups, N-vinyl 2-pyrolidinone, dimethylacrylamide, methacrylic acid and methods for the manufacturing thereof.

28 Claims, No Drawings

FLUOROSULFONE-SILICONE HYDROGEL, RGP CONTACT LENSES, OPTICAL MEDICAL DEVICES AND COMPOSITIONS THEREOF

BACKGROUND OF THE INVENTION

1. Field of the Invention

The present invention relates to novel bis(perfluoroalkylsulfonyl)amidoalkyl ester monomers of acrylic or methacrylic acids and bis(alkylsulfonyl) amidoethyl ester monomers of acrylic and methacrylic acid, which are used to produce polymers for the purpose of manufacturing various types of contact lenses and other optical devices, including optical medical devices. In particular, one important use of the materials made from the invention is the manufacture of corneal contact lenses.

2. Description of the Related Art

In recent years, hydrophilic corneal lenses have become more and more popular in the United States, Canada, and throughout the world. In an attempt to create contact lenses which are comfortable, oxygen permeable, and essentially clean from deposits, it requires incorporation of the longer fluorocarbon chain component in order to make the surface of the lens slick—permitting easy movement on the eye without any friction and wettable to accomplish necessary comfort for the patient.

Previous hydrophilic contact lenses are based on 2-hydroxyethyl methacrylate (HEMA) or derivatives thereof which produce reasonable comfort to the patient while they are clean; however, when worn for a longer period of time they have a tendency to accumulate deposits or debris on the surface of the lens and then require constant cleaning or in other cases become disposable. The patient then has to dispose of the contact lenses and get new ones.

While such materials accumulate proteinaceous matter as deposits on the surface of the lens, the lens is impaired to proper transparency; or, if the deposits on the lens are too large, the lens could cause abrasion to the wearer's eyes. In recent years Nicolson describes, in U.S. Pat. No. 5,789,461 and related counterparts, extended wear hydrophilic contact lenses based on fluoroethers and amido compound. However, as practical experience shows patients require longer periods of time for adaptation to use such lenses.

Furthermore, in U.S. Pat. No. 4,095,877, Stoy teaches how to crosslink macromolecular block copolymers using acrylonitrile, formaldehyde, butyraldehyde with polyisocyanate such as hexamethylene diisocyanate or m-toluylene diisocyanate, diepoxides and similar components.

In Harvey III, U.S. Pat. No. 4,711,943, silicone hydrogel contact lens describes copolymers made from amidosilicone methacrylates as his invention.

In an earlier Novicky patent, U.S. Pat. No. 4,748,224, he describes silicone-sulfone contact lenses as RGP lenses and semi-RGP's. However, it is desirable to invent contact lenses with superior comfort from initial placement of the lens on the human eye to achieve patient satisfaction and patient desire to use contact lenses.

SUMMARY OF THE INVENTION

The present invention, therefore, is intended to improve performance of contact lenses on human eyes. The copolymers of the present invention will give very good optical clarity when hydrated because the copolymers contain a fluorocarbone chain monomer that reduces surface tension, that gives very good slick surface of the lens and remains free of debris or deposits, even when lenses are worn for longer periods of time. The copolymer plastic, when hydrated, will have increased strength over HEMA hydrophilic contact lenses. The copolymer plastic of the present invention can be prepared by polymerization in rod form and then processed into contact lens blanks and ultimately into contact lenses; or, can be directly cast molded in specific molds directly into the shape of contact lenses. The said contact lenses when immersed in Alcon OPTI-FREE contact lens solution gives wettable or an hydrophilic contact lens polymer.

DETAILED DESCRIPTION OF THE PREFERRED EMBODIMENTS

A still further face of the invention includes synthesis of the copolymer plastic which, when hydrated in saline solution, gives a water content between 0.1% to 40% that can be used for other medical devices, such as intra-ocular lenses, lenses for instruments used for body contact and health diagnostic instruments.

The present invention includes the following novel monomers:

(1) Bis(perfluoroalkylsulfonyl)amidoethyl methacrylate or acrylate having the following general formula:

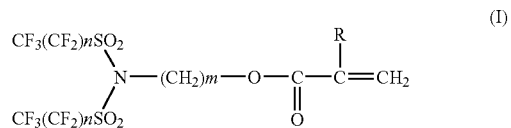

where n is an integer from 0 to 16; m is an integer from 1 to 5 and R is a methyl group or hydrogen.

(2) (N-perfluoroalkylsulfonyl-N'-alkylsulfonyl)amidoethyl methacrylate or acrylate having the following general formula:

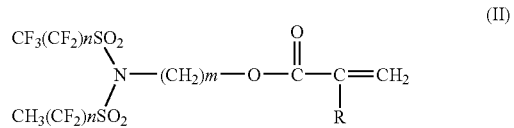

where n is an integer from 0 to 16; m is an integer from 1 to 5 and R is a methyl group or hydrogen.

(3) Bis(alkylsulfonyl)amidoalkyl methacrylate or acrylate having the following general formula:

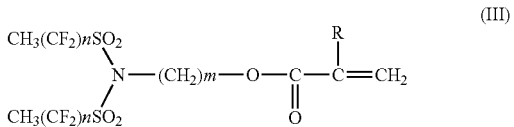

where n is an integer from 0 to 16; m is an integer from 1 to 5 and R is a methyl group or hydrogen.

(4) Another useful perfluoroalkylsulfoneamidoethyl methacrylate monomer from prior art is: 2-(N-ethylperfluorobutylsulfonamido)ethylmethacrylate

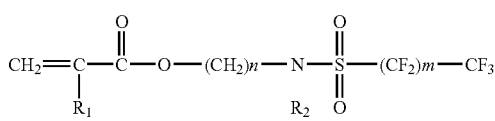

(IV)

wherein $R_1$ and $R_2$, which may be the same or different, are hydrogen, alkyl, cyclic or phenyl groups, where n is an integer from 1 to 5 and m is an integer from 0 to 10. Typical monomers are: 2-(N-ethylperfluoroalkylsulfonylamido) ethyl methacrylate, 2-(N-ethylperfluoroalkylsulfonyl-amido)ethyl acrylate or mixtures thereof.

Representative of the hydroxyalkyl monomer of acrylic or methacrylic acid are those having the following general formula:

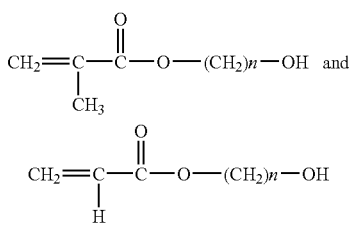

where n is an integer from 1 to 5, 2,3 dihydroxypropyl acrylate and 2,3 dihydroxypropyl methacrylate or mixtures thereof.

Representative of heteroatom hydrophilic monomer are those having the following general formulas:

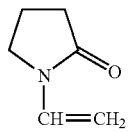  and  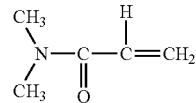

N-Vinyl2-pyrrolidinone      Dimethylacrylamide

Oxygen permeability monomer is represented by organosiloxanylalkyl ester monomers of acrylic and methacrylic acid have the structural formula:

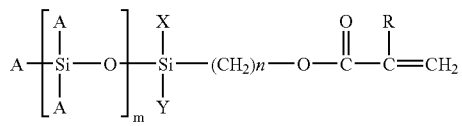

(I-Si)

wherein, X and Y are $C_1$ to $C_6$, alkyl, cyclic or phenyl groups and/or groups of the following structure:

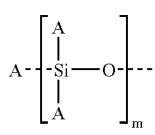

m being an integer from 1 to 6, n being an integer from 1 to 3, A is selected from $C_1$ to $C_6$, alkyl or phenyl groups, and R is a methyl group or hydrogen.

A second useful group of organosiloxanylalkyl ester monomers of acrylic and methacrylic acids are represented by the following formula:

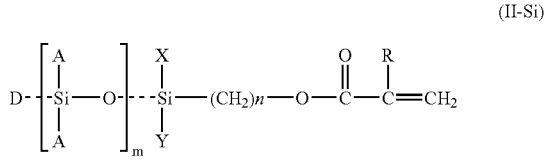

(II-Si)

wherein, X and Y are $C_1$ to $C_6$, alkyl or phenyl groups or groups of the following structure:

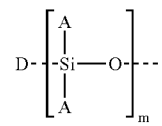

m being an integer from 1 to 6, n being an integer from 1 to 3, A is selected from $C_1$ to $C_6$, alkyl or phenyl groups, R is a methyl group or hydrogen, and D is hydrogen or hydroxy group.

A third useful group of oganosiloxanylalkyl ester monomers of acrylic and methacrylic acids are represented by the following structural formula:

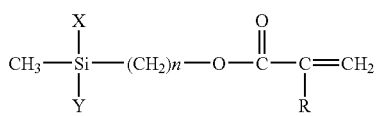

(III-Si)

wherein, X' and Y are groups of the following structure:

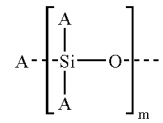

m being an integer from 1 to 5, n is an integer from 1 to 3, where A is selected from $C_1$ to $C_6$, alkyl, cyclic or phenyl groups and R is a methyl group or hydrogen.

The copolymer plastic can be further modified to suppress deposits on the surface of the lens by incorporation of the fluorocarbon ester monomers of acrylic and methacrylic acids, namely:

perfluoroalkyl ester monomer having the general formula:

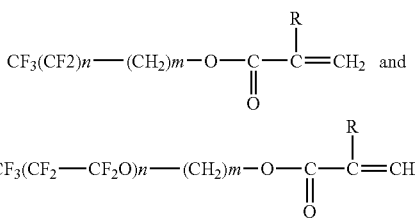

where n is an integer from 0 to 20; m is integer from 1 to 5 and R is hydrogen or methyl group.

Additional fluorocarbone monomers can also be incorporated into copolymer plastic of the present invention, such as:

1H,1H,7H-Dodecafluoroheptyl acrylate;
1H,1H,7H-Dodecaflurohеptyl methacrylate;
1H,1H-Heptafluorobutyl acrylate;
1H,1H-Heptaflurobutyl methacrylate;
Hexafluoroisopropyl acrylate;
Hexafluoroisopropyl methacrylate;
Hexafluoro-2-methylisopropyl acrylate;
2,2,3,3,4,4,5,5-Octafluro-1,6-hexyl diacrylate;
2,2,3,3,4,4,5,5-Octafluoro-1,6-hexyl dimethacrylate;
2,2,3,3,3-Pentafluoropropyl methacrylate;
1H,1H,2H,2H-Perfluorodecyl acrylate;
1H,1H,2H,2H-Perflurodecyl methacrylate;
1H,1H,9H-Perflurononyl acrylate;
1H,1H,9H-Perfluorononyl methacrylate;
1H,1H-Perfluoro-n-octyl acrylate;
1H,1H,2H,2H-Perfluorooctyl acrylate;
mono-1H,1H-Perfluorooctyl itaconate;
1H,1H-Perfluoro-n-octyl methacrylate;
1H,1H,2H,2H-Perfluorooctyl methacrylate;
1H,1H,11H-Perfluoroundecyl acrylate;
1H,1H,11H-Perfluoroundecyl methacrylate;
and alkyl sulfone monomers can also be incorporated. The preferable monomers are:
methyl vinyl sulfone,
methyl styrene sulfone,
ethyl vinyl sulfone,
ethyl styrene sulfone,
propyl vinyl sulfone,
propyl styrene sulfone,
phenyl vinyl sulfone,
phenyl styrene sulfone,
cyclohexyl vinyl sulfone,
cyclohexyl styrene sulfone,
pentyl vinyl sulfone,
pentyl styrene sulfone,
butyl vinyl sulfone,
butyl styrene sulfone,
phenoxyethyl vinyl sulfone,
phenoxyethyl styrene sulfone,
divinyl sulfone,
methacryloxyethyl methyl sulfone,
methacryloxyethyl ethyl sulfone,
methacryloxyethyl propyl sulfone
methacryloxyethyl butyl sulfone,
methacryloxyethyl phenyl sulfone,
methacryloxyethyl pentyl sulfone,
methacryloxyethyl styrene sulfone, or mixtures thereof.

The copolymer plastic material can also be modified by adding amounts of alkyl or cyclic ester monomer of acrylic or methacrylic acids; preferably, methyl methacrylate, methyl acrylate, ethyl methacrylate, ethyl acrylate, cyclohexyl methacrylate, 2-hydroxycyclohexyl methacrylate, propyl methacrylate and propyl acrylate.

The hydrophilic contact lens material can be further modified to achieve better hydration of the lens by the addition of methacrylic acid or acrylic acid and a small amount of cross-linking agent to improve overall performance of the contact lenses. Representative cross-linking agents are ethyleneglycol dimethacrylate, diethyleneglycol dimethacrylate, triethyleneglycol dimethacrylate, triethyleneglycol diacrylate, tetraethyleneglycol diacrylate, divinyl benzene, divinyl sulfone, trimethylolpropane trimethacrylate and mixtures thereof.

The preferred composition of the present invention comprises:

(a) from about 1 to 60 weight percent of ethylenically unsaturated perfluoroalkylsulfoneamidoethyl ester monomers of acrylic or methacrylic acid and alkylsulfoneamidoethyl esters monomers of acrylic and methacrylic acid or mixtures thereof;

(b) from about 1 to 50 weight percent of ethylenically unsaturated hydroxyalkyl monomer of acrylic or methacrylic acid or mixtures thereof;

(c) from about 5 to 65 weight percent organosilicone monomer;

(d) from 2 to 40 weight percent of unsaturated wettability agemt monomers or mixtures thereof;

(e) from about 0.1 to 8 weight percent of acrylic or methacrylic acid or mixtures thereof;

(f) from about 0.1 to 10 weight percent of cross-linking agent monomers (preferably, ethyleneglycol dimethacrylate, diethyleneglycol dimethacrylate, triethyleneglycol dimethacrylate, tetraethyleneglycol dimethacrylate or mixtures thereof;

(g) from about 1 to 20 weight percent of alkyl or cyclic esters monomer of methacrylic acid and acrylic acid;

(h) from about 1 to 20 weight percent of perfluoroalkyl ester monomer of acrylic and methacrylic acids or mixtures thereof and (i) from about 1 to 20 weight percent of additional cross-linking agent such as diisocyanates preferably 2-isocyanatoethyl methacrylate, 1,2 diisocyanatopropane, 1,4 diisocyanatobenzene, m-toluylene diisocyanate, 1,5 diisocyanato 1-carboxypenatane and other isocyanates can also be useful.

The polymerization of the oxygen permeable wettable contact lens material is disclosed in the prior art using free-radical polymerization techniques such as disclosed in Novicky U.S. Pat. No. 4,861,850.

Examples 1–3 illustrate the preparation of new organosulfoneamide ester monomers of acrylic and methacrylic acid.

Another composition according to the invention is a contact lens material comprising from about 5 to 65 weight percent of the group consisting of Bis(perfluoroalkylsulfonyl)amidoalkyl methacrylate, Bis(alkylsulfonyl)amidoalkyl methacrylate and mixtures thereof;

from about 2 to 30 weight percent of organosilicone monomer selected from the group consisting of (I-Si), (II-Si), (III-Si) of the following formulas:

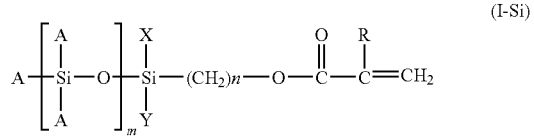
(I-Si)

wherein X and Y are $C_1$ to $C_6$, alkyl, cyclic or phenyl groups and!or groups of the following structures:

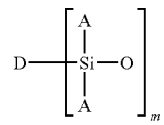

m being an integer from 1 to 6, n being an integer from 1 to 3, A is selected from $C_1$ to $C_6$, alkyl or phenyl groups, and R is a methyl group or hydrogen;

a group of organosiloxanylalkyl ester monomers of acrylic and methacrylic acid represented by the following formula:

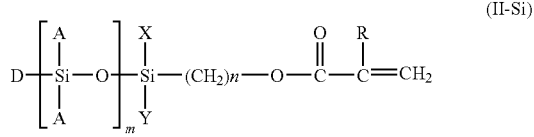 (II-Si)

wherein, X and Y are $C_1$ to $C_6$, alkyl or phenyl groups or groups of the following structure:

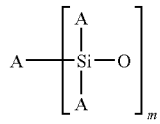

m being an integer from 1 to 6, n being an integer from 1 to 3, A is selected from $C_1$ to $C_6$, alkyl or phenyl groups, R is a methyl group or hydrogen and D is hydrogen or hydroxy group.; and a group of organosiloxanylalkyl ester monomers of acrylic and methacrylic acids represented by the following structural formula:

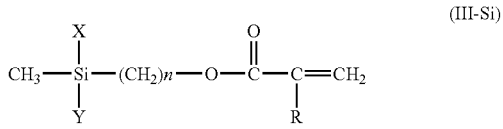 (III-Si)

wherein X and Y are groups of the following structure:

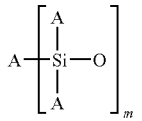

m being an integer from 1 to 5, n is an integer from 1 to 3, wherein, A is selected from $C_1$ to $C_6$, alkyl, cyclic or phenyl groups and R is a methyl group or hydrogen and mixtures thereof;

from about 5 to 40 weight percent of 2-hydroxyethyl methacrylate or 2,3-dihydroxypropyl methacrylate, dimethylacrylamide, N-vinyl 2-pyrrolidinone or mixtures thereof from about 1 to 20 weight percent of diisocyanates;

from about 1 to 30 weight percent of perfluoroalkyl ester monomer of acrylic or methacrylic acid; and from about 1 to 10 weight percent of cross-linking agents selected from the group consisting of ethyleneglycol dimethacrylate, diethyleneglycol dimethacrylate, triethyleneglycol dimethacrylate, tetraethyleneglycol dimethacrylate, dimethacrylate siloxyanyl ester monomer, ethyleneglycol diacrylate, tetraethylene-glycol diacrylate, divinyl benzene sulfone or mixtures thereof; said contact lens material additionally embodies methacrylic acid or acrylic acid each in an amount up to an amount sufficient to constitute, with other components, 100 weight percent of the contact lens material.

EXAMPLE 1

A sodium salt was prepared by dissolving 4000 grams of bis(pentafluoroethylsulfonyl)-imide in 4000 ml of pure methyl alcohol, then was added 521.0 grams of sodium methoxide ($CH_3ONa$) which was dissolved in 2500 ml of absolute methanol with the continuous stirring of a 22 liter, 3 neck flask. After 1 hour of stirring, the methanol was removed by distillation until the temperature in the flask reached 70–80° C. The yield of dry salt product was 4220 grams.

To a 12 liter flask equipped with thermometer, stirrer and distilling head, was charged 4200 grams of the aforesaid dry sodium salt and then 780 grams of ethylene chlorohydrin ($ClCH_2CH_2OH$) was added. The mixture was heated until liquidified. The stirring and heating continued until the temperature of 115° C. was reached; heating and stirring was maintained at 115° C. for 7 hours thereafter. 50.0 grams of sodium methoxide in 250 ml of methanol was added to the mixture. After ½ hour the methanol was distilled off and the temperature of the flask was increased to 120° C.;155 grams of chlorohydrin was added to the mixture and the temperature was held at 115°–120° C. for 6 hours.

The reaction mixture was then cooled down to 35° C. and 7 liters of diethyl ether was added. The mixture was heated and stirred at reflux for 45 minutes, cooled down to room temperature and filtered with suction on a Buchner funnel precoated with Celite-545.

The filtrate was then transferred to a 5 liter separatory funnel and washed with 2500 ml of $H_2O$, then with 4% $N_aOH$ solution and again with water twice.

The washed ether solution was charged to a 12 liter flask equipped with a distilling head and mechanical mixer and the ether was distilled off. At the end of the distillation, reduced pressure was applied yielding 3530 grams of product that was identified by IR as bis(pentafluoroethylsulfonyl) amidoethanol.

EXAMPLE 2

To a 3 liter, 3 neck flask, equipped with mechanical stirrer, thermometer and water cooled reflux condenser, was charged 320.0 grams of bis(methylsulfonyl)imide, 90.0 grams of paraformaldehyde (94% purity) and 600 ml of dry pure methanol. Sodium methoxide was added to the solution until pH 10 was obtained. Heating was applied on the flask and refluxed for a 42 hour period. The reaction mixture was cooled down to room temperature and methanol was slowly stripped off until the temperature reached 105° C. Again, the flask was cooled down and 1000 ml of diethyl ether was added to the flask and stirred for ½ hour. The content of the 3 liter flask was transferred to a separatory funnel and washed with water and again with 3% HCl solution; the final washing was completed with distilled water. Diethyl ether extract of bis(methylsulfonyl)amidomethanol was dryed over $MgSO_4$ anhydrous; $MgSO_4$ was then removed by filtration. The crude product in diethyl ether was purified by distillation. The yield was 73% of bis(methylsulfonyl)amidomethanol and the identity of the compound was confirmed by an IR analysis.

EXAMPLE 3

To a 5 liter, 3 neck round bottom flask equipped with mechanical stirrer, thermometer and reflux condenser was charged: 2500 ml of dry toluene and 300 grams of bis (perfluoroethyl-sulfonyl)amidoethanol which was stirred until all sulfoneamide was dissolved. The flask was charged with 80 grams of triethylamine. At room temperature 170.0 grams of methacryloyl chloride was slowly added from an additional funnel over 1½ hour period; white ppt was formed in the flask of (CH₃CH₂)₃.N.HCl. When all of the methacryloyl chloride addition was completed the flask was warmed up to 65–70° C. for 1 hour. The flask was cooled down to ~15° C. using an ice water mixture. White ppt was filtered off on a Buchner funnel which was pre-coated with a Celite-545 filter aid using suction methods.

When all filtration was completed the triethylamine.HCl was washed with cold, dry toluene to extract all product. Toluene and the corresponding ester of methacrylic acid was combined and washed with water one time and the toluene was removed by distillation until the temperature reached 105° C. and full vacuum ~0.5 mm Hg. The product was distilled at 105° to 120° C. and full vacuum. GC analysis and amount of the product established the yield to be 91%. IR analysis indentified the desirable product to be bis(perfluoroethylsulfonyl)amidoethyl methacrylate.

EXAMPLE 4

This illustrates the preparation of representative copolymer plastic material for hydrophilic contact lenses:

To a 200 ml flask was added 20 grams of HEMA (2-hydroxyethylmethacrylate), 15 grams of N-vinyl 2-pyrrolidinone, 25 grams of Bis(perfluoroalkylsulfonyl)amidoethyl methacrylate, 30 grams of organosilicone monomer (I-Si), 10 grams of methyl methacrylate and 5 grams of methacrylic acid and 0.5 grams of t-butylperoxyoctoate. All components were mixed thoroughly and poured into polypropylene tubes/molds closed with stoppers and polymerized in a water bath or thermostated oven set at 65° C. for a period of about 20 hours. The rods or blanks were then put into a thermostated oven preheated at 105° C. for a period of 24 hours. The copolymer plastic was hard and suitable for the manufacturing of contact lenses. When immersed in a saline solution (such as Alcon OPTI-FREE), the plastic became an hydrophilic lens having a water content of about 24.2 weight percent. Oxygen permeability of the material was measured using Schema-Versatae Model 920 instrument and the Dk value for the material was determined to be 87.3 (cm₂/sec) (ml O₂/ml sol×mm Hg).

EXAMPLE 5

This example illustrates the preparation of direct casting of contact lenses. To a 200 ml flask was added 20 grams of (N-perfluoroalkylsulfonyl-N'-methylsulfonyl)amidoethyl methacrylate, 20 grams of 2-hydroxyethyl methacrylate, 15 grams of N-vinyl pyrrolidinone, 30 grams of organosilicone monomer (II-Si), 15 grams of methyl methacrylate, 8 grams of methacrylic acid, 3 grams of TEGMA and 0.5 grams of free radical catalyst VAZO 67. All components were thoroughly mixed and poured into contact lens casting molds (such as described in Travnicek U.S. Pat. No. 4,165,158). Polymerization was carried out at room temperature (21° C. ) by gradually increasing to 115° C. over a period of 3 hours; this temperature was maintained for an additional 2 hours to finish the polymerization. The oven was turned off and the temperature was gradually brought back down to room temperature. The casting molds were removed from the oven and separated. The contact lenses were removed from the concave portion of the mold and hydrated in Alcon OPTI-FREE multi-purpose solution. The expansion factor was 1.15 and the water content of the lenses was 23 weight percent. The power of the lenses on hydration changed 0.75 diopters. The hydrated lenses were very clear, slippery, wettable and suitable for hydrophilic contact lenses.

EXAMPLE 6

This example illustrates the preparation of the representative copolymer plastic material for hydrophilic contact lenses. To a 200 ml flask was added 30 grams of distilled HEMA, 15 grams of N-vinyl 2-pyrrolidinone, 1.5 grams of diethyleneglycol dimethacrylate, 4.5 grams of methacrylic acid, 20 grams of Bis(methylsulfonyl)amidoalkyl methacrylate, 20 grams of organosilicone monomer (I-Si) and 10 grams of methyl methacrylate. The mixture was stirred together thoroughly and 0.5 grams of IABN catalyst was added, then stirred again until all catalyst was dissolved. The mixture was poured into contact lens mold cavities. The molds were closed with the convex part of the mold, then polymerized in a thermostated oven at a programmable temperature starting from 30° C. to 118° C. over a 2 hour period. The molds were slowly cooled down in the oven until room temperature was reached. The molds were removed from the oven and the lenses were removed from the casting molds. The lenses were then hydrated for a period of 2–3 days in Alcon OPTI-FREE solution.

EXAMPLE 7

This example illustrates the preparation of copolymer plastic material with an additional polysulfone monomer. To a 200 ml flask was added 15 grams of distilled HEMA, 5 grams of vinylmethyl sulfone, 10 grams of N-vinyl 2-pyrrolidinone, 20 grams of Bis(methylsulfonyl)-amidoethyl methacrylate, 15 grams of 2-(N-ethylperfluorobutylsulfonylamido)ethyl methacrylate 25 grams of organosilicone monomer (III-Si) and 10 grams of methyl methacrylate. The mixture was stirred thoroughly and 0.5 grams of IABN catalyst was added; the mixture was stirred again until all the catalyst was dissolved. The mixture was poured into suitable polypropylene molds and polymerized in a thermostated oven starting from 30° C. to 127° C., programmable over a 3 hour period of time. The lenses were processed in the same way as in Example 3, using the Alcon OPTI-FREE solution for the hydration of the lenses.

EXAMPLES 8–13

Samples of optically clear plastic hydrophilic contact lenses were prepared in accordance with EXAMPLE 3; however, component compositions were different as described in the following table:

TABLE

| Components (Parts) | Example Number | | | | | |
|---|---|---|---|---|---|---|
| | 8 | 9 | 10 | 11 | 12 | 13 |
| 2-(N-ethylperfluorobutylsulfonamido)ethyl methacrylate | — | 5 | — | — | 5 | — |
| N-vinyl 2-pyrrolidinone | 15 | 10 | 12 | 15 | 20 | 18 |
| 2-hydroxyethylmethacrylate | 20 | 25 | 30 | 14.5 | 20 | 18 |
| methacrylic acid | 5 | 7 | 6 | 5 | — | 5 |
| ethyleneglycol dimethacrylate | 2 | — | 0.5 | — | — | — |

TABLE-continued

|  | Example Number | | | | | |
| --- | --- | --- | --- | --- | --- | --- |
| Components (Parts) | 8 | 9 | 10 | 11 | 12 | 13 |
| diethyleneglycol dimethacrylate | — | 3 | — | 1.5 | — | — |
| organosilicone monomer (I-Si) | 30 | 25 | 20 | 23 | 20 | 25 |
| organosilicone monomer (II-Si) | — | — | — | 11 | — | — |
| methylvinyl sulfone | — | 5 | — | — | — | — |
| phenyl styrene sulfone | — | — | 8 | — | — | — |
| methyl methacrylate | 5 | 5 | 10 | 10 | 10 | 10 |
| methacryloxyethylmethyl sulfone | — | — | — | 5 | — | — |
| Bis(perfluoroalkylsulfonyl)amidoethyl methaciylate | 20 | — | 3.5 | 15 | — | 19 |
| N-perfluoroalkylsulfonyl-N'-methylsulfonylamidoethyl methacrylate | — | 15 | — | — | 25 | — |
| Bis(methylsulfonyl)amidoalkyl methacrylate | 3 | — | 10 | — | — | 5 |

Note:
All samples of the above copolymer plastics were clear after hydration.

EXAMPLE 14

This example illustrates the preparation of prepolymers for direct molding process of contact lenses.

To a 2 liter, round bottom 3 neck flask equipped with double jacket, for the capability to heat and cool reaction mixtures by using hot and/or cold water on the jacket, a mechanical stirrer, reflux condenser and thermometer was added: 15 parts of methyl methacrylate, 20 parts of 2-hydroxyethyl methacrylate, 28 parts of dimethyl acrylamide, 25 parts of bis(methylsulfonyl)-amidoethyl methacrylate, 10 parts of organosilicone ester monomer of methacrylic acid (II-Si), 1.5 parts of ethylene glycol dimethacrylate and 0.08 parts of t-butyl peroxyoctoate.

The mixture was stirred thoroughly and slow heat was applied in the flask using warm water. The mixture was continuously stirred and heat was applied until the temperature reached 70° C. After ½ hour the mixture became more viscose. Once the reaction mixture had the desirable viscosity, the hot water on jacket was turned off and the cold water was applied to the flask. The reaction mixture was then cooled down to 16° C. The prepolymer was removed from the reaction flask, drained into a dark brown bottle and stored in the refrigerator at 0–5° C. for future use in the direct casting or molding of contact lenses.

EXAMPLE 15

This example illustrates direct molding of corneal contact lenses.

To a 250 ml Erlenmeyer flask was added 100 grams of prepolymer prepared in Example 14 and 0.4 grams of Vazo 64 free radical catalyst. The catalyst was mixed in the prepolymer until completely dissolved. The prepolymer mixture was then transferred to suitable contact lens molds (such as CooperVision or UltraVision molds); thereafter, all molds were filled and the closing caps were applied and sealed. The molds were placed in a thermostated oven capable of increased temperatures from 30° C. to 35° C. in a period of 2½–3 hours. Once the temperature reached 132° C., the oven temperature was held in the range of 132–135° C. for an additional 2 hours. The heating was turned off and the temperature was gradually dropped down to room temperature in about 4–5 hours.

The molds containing the contact lenses were removed from the oven and processed by known techniques. The contact lenses were transferred to hydration vials where Alcon Opti-Free soaking solution was added to hydrate the lenses. After 2 days the lenses were inspected and it was determined that the water content of the lens was 26.5%.

EXAMPLE 16

Preparation of Prepolymer A.

To 250 ml round bottom, 3 neck flask equipped with double jacket (for the capability to heat and cool reaction mixtures by using hot and/or cold water in the jacket) a mechanical stirrer, reflux condenser and thermometer was added: 30 parts of methyl methacrylate, 40 parts of 2-hydroxyethyl methacrylate, 5 parts of triethyleneglycol dimethacrylate, 10 parts of m-toluylene diisocyanate and 0.1 part of Vazo 64 catalyst. The monomers were mixed thoroughly and were continuously stirred while heat was applied the same way as in Example 15. When viscosity of the Prepolymer A reached the desired point, the viscous syrupy mixture was transferred to a dark brown bottle and stored in the refrigerator.

Preparation of Prepolymer B.

To a 250 ml round bottom, 3 neck flask equipped with double jacket (for the capability to heat and cool reaction mixtures by using hot and/or cold water in the jacket) a mechanical stirrer, reflux condenser and thermometer was added: 40 grams of dimethylacrylamide, 10 grams of N-Vinyl 2-pyrrolidinone, 40 grams of organosilicone monomer (I-Si), 10 grams of bis(N-perfluoro-ethylsulfonyl)amidoethyl methacrylate and 0.2 grams of Vazo 64 catalyst. The prepolymer was prepared in the same technique as described in Example 14 and stored in the refrigerator for use in direct molding of contact lenses with Prepolymer A.

EXAMPLE 17

This example demonstrates direct molding of silicone hydrogel contact lenses.

To a 250 ml Erlenmeyer flask was added 50 grams of Prepolymer A and 50 grams of Prepolymer B which was prepared in Example 16. Also added was 0.35 grams of t-butylperoxyoctoate and the viscous prepoplymers were mixed thoroughly together. The prepolymer mixture was dispensed to contact lens molds and sealed using molding caps. The molds were placed in a thermostated oven in the same way as in Example 15; the polymerization process was identical to the above cited Example. The contact lenses were then removed from the molds and hydrated in Alcon Opti-Free multi purpose solution. The contact lenses were oxygen permeable and hydrophilic.

Although I have described my invention in connection with specific examples and preferred embodiments thereof, it is readily apparent to those skilled in the art that the invention may be modified without departing from the scope of the claims

The invention claimed is:

1. A plastic material formed of a copolymer which comprises: from about 5 to about 80 weight percent of at least one monomer selected from the group consisting of:
   (1) Bis(perfluoroalkylsulfonyl)amidoalkylmethacrylate or acrylate having the following general formula:

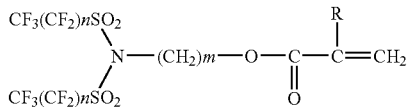

where n is an integer from 0 to 16; m is an integer from 1 to 5; R is a methyl group or hydrogen;
   (2) (N-perfluoroalkylsulfonyl-N'-methylsulfonyl)amidoalkyl methacrylate or acrylate having the following general formula:

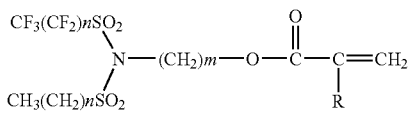

where n is an integer from 0 to 16; m is an integer from 1 to 5; R is a methyl group or hydrogen;
   (3) Bis(alkylsulfonyl)amidoalkyl methacrylate or acrylate having the following general formula:

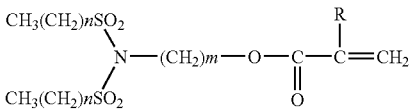

where n is an integer from 0 to 16; m is an integer from 1 to 5; R is a methyl group or hydrogen.

2. A copolymer plastic material of claim 1, wherein said material is modified by incorporating from about 2 to 30 weight percent (based on the total weight of said plastic material) of perfluoroalkyl ester monomers of acrylic, methacrylic and itaconic acid or mixtures thereof.

3. A copolymer plastic material of claim 1, wherein said material is modified by incorporating from about 1 to 10 weight percent (based on the total weight of said plastic material) of diisocyanate as a cross-linking agent.

4. A copolymer plastic material of claim 1, wherein said polymer is further modified by the incorporation of organosulfone ester monomer of acrylic and methacrylic acid or an organosulfone momoner having a vinyl polymerizable group.

5. A plastic material according to claim 1, wherein said copolymer incorporates isocyanates selected from diisocyanates.

6. The plastic material according to claim 1, wherein said copolymer incorporates isocyanates selected from the group consisting of 2-isocyanatoethyl methacrylate, 1,2 diisocyanatopropane, 1,4 diisocyanatobenzene, m-toluylene diisocyanate and 1,5 diisocyanate 1-carboxypentane.

7. The plastic material of claim 1, wherein when the monomer is (1), n is 1.

8. The plastic material of claim 1, wherein when the monomer is (1), n is 0.

9. The plastic material of claim 1, wherein when the monomer is(2), n is 1.

10. The plastic material of claim 1, wherein when the monomer is (2), n is 0.

11. The plastic material of claim 1, wherein when the monomer is (3), n is 1.

12. The plastic material of claim 1, wherein when the monomer is (3), n is 0.

13. An ophthalmic device which is manufactured from oxygen permeable and hydrophilic copolymer plastic material which comprises of at least one from the following monomers:
   (1) Bis(perfluoroalkylsulfonyl)amidoalkyl methacrylate or acrylate having the following general formula:

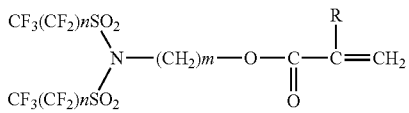

where n is an integer from 0 to 16; m is an integer from 1 to 5; R is a methyl group or hydrogen;
   (2) (N-perfluoroalkylsulfonyl-N'-alkylsulfonyl)amidoalkyl methacrylate or acrylate having the following general formula:

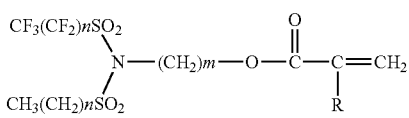

where n is an integer from 0 to 16; m is an integer from 1 to 5; R is amethyl group or hydrogen;
   (3) Bis(alkylsulfonyl)amidoalkyl methacrylate or acrylate having the following general formula:

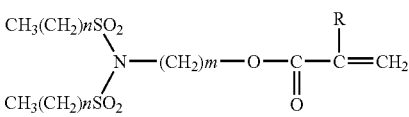

where n is an integer from 0 to 16; m is an integer from 1 to 5; R is a methyl group or hydrogen.

14. The ophthalmic device of claim 13, which is manufactured from oxygen permeable and hydrophilic copolymer plastic material; said plastic embodies at least one organosilicone monomer selected from the group consisting of the following formulas:

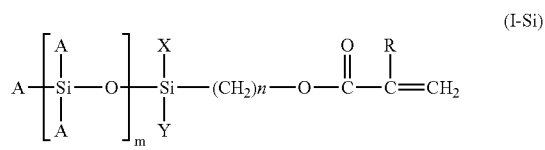

wherein X and Y are $C_1$ to $C_6$, alkyl, cyclic or phenyl groups and/or groups of the following structures:

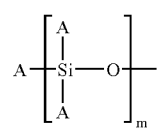

m being an integer from 1 to 6, n being an integer from 1 to 3, A is selected from $C_1$ to $C_6$, alkyl or phenyl groups, and R is a methyl group or hydrogen;

a group of organosiloxanylalkyl ester monomers of acrylic and methacrylic acid represented by the following formula:

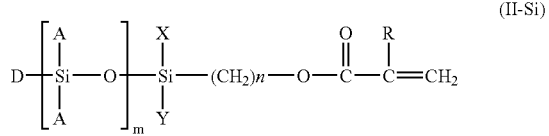
(II-Si)

wherein, X and Y are $C_1$ to $C_6$, alkyl or phenyl groups or groups of the following structure:

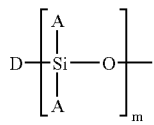

m being an integer from 1 to 6, n being an integer from 1 to 3, A is selected from $C_1$ to $C_6$, alkyl or phenyl groups, R is a methyl group or hydrogen and D is hydrogen or hydroxy group; and a group of organosiloxanylalkyl ester monomers of acrylic and methacrylic acids represented by the following structural formula:

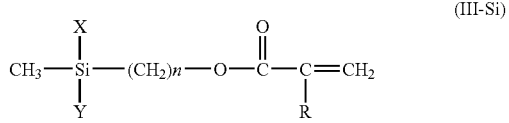
(III-Si)

wherein X and Y are groups of the following structure:

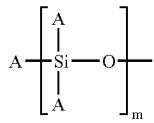

m being an integer from 1 to 5, n is an integer from 1 to 3, wherein, A is selected from $C_1$ to $C_6$, alkyl, cyclic or phenyl groups and R is a methyl group or hydrogen.

15. The ophthalmic device of claim 13, wherein in formula 2, n is 0.

16. The ophthalmic device of claim 15, wherein R is methyl.

17. A contact lens material comprising from about 5 to 65 weight percent of a compound selected from the group consisting of Bis(perfluoroalkylsulfonyl)amidoalkyl methacrylate, Bis(alkylsulfonyl)amidoalkyl methacrylate and mixtures thereof; from about 2 to 30 weight percent of organosilicone monomer selected from the group consisting of (I-Si), (II-Si) and (III-Si) of the following formulas:

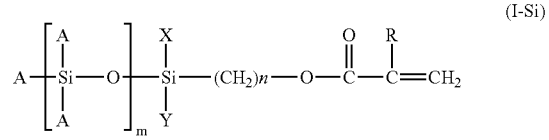
(I-Si)

wherein X and Y are $C_1$ to $C_6$, alkyl, cyclic or phenyl groups and/or groups of the following structures:

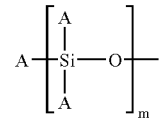

m being an integer from 1 to 6, n being an integer from 1 to 3, A is selected from $C_1$ to $C_6$, alkyl or phenyl groups, D is hydrogen or hydroxy group and R is a methyl group or hydrogen;

a group of organosiloxanylalkyl ester monomers of acrylic and methacrylic acid represented by the following formula:

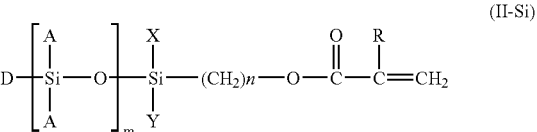
(II-Si)

wherein, X and Y are $C_1$ to $C_6$, alkyl or phenyl groups or groups of the following structure:

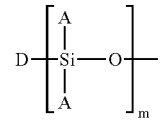

m being an integer from 1 to 6, n being an integer from 1 to 3, A is selected from $C_1$ to $C_6$, alkyl or phenyl groups, R is a methyl group or hydrogen and D is hydrogen or hydroxy group; and a group of organosiloxanylalkyl ester monomers of acrylic and methacrylic acids represented by the following structural formula:

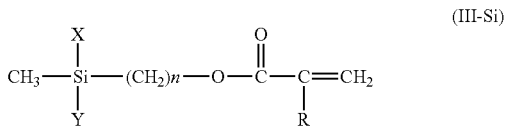
(III-Si)

wherein X and Y are groups of the following structure:

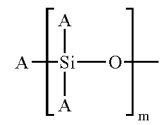

m being an integer from 1 to 5, n is an integer from 1 to 3, wherein, A is selected from $C_1$ to $C_6$, alkyl, cyclic or phenyl groups and R is a methyl group or hydrogen and mixtures thereof from about 5 to 40 weight percent of 2-hydroxyethyl methacrylate or 2,3-dihydroxypropyl methacrylate, dimethylacrylamide, N-vinyl 2-pyrrolidinone or mixtures thereof; from about 1 to 20 weight percent of diisocyanates; from about 1 to 30 weight percent of perfluoroalkyl ester monomer of acrylic or methacrylic acid; and from about 1 to 10 weight percent of cross-linking agents selected from the group consisting of ethyleneglycol dimethacrylate, diethyleneglycol dimethacrylate, triethyleneglycol dimethacrylate, tetraethyleneglycol dimethacrylate, dimethacrylate siloxyanyl ester monomer, ethyleneglycol diacrylate, tetraethyleneglycol diacrylate, divinyl benzene sulfone or mixtures thereof; said contact lens material additionally embodies methacrylic acid or acrylic acid each in an amount up to an amount sufficient to constitute, with other components, 100 weight percent of the contact lens material.

18. A medical device which is manufactured by direct molding in which a monomer selected from the group (1), (2) and (3)

(1) Bis(perfluoroalkylsulfonyl)amidoalkylmethacrylate or acrylate having the following general formula:

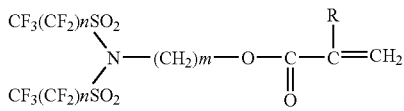

where n is an integer from 0 to 16; m is an integer from 1 to 5; R is a methyl group or hydrogen:

(2) (N-perfluoroalkylsulfonyl-N'-methylsulfonyl)amidoalkyl methacrylate or acrylate having the following general formula:

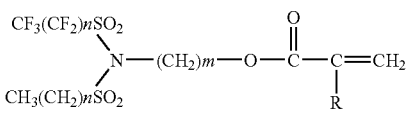

where n is an integer from 0 to 16; m is an integer from 1 to 5; R is a methyl group or hydrogen:

(3) Bis(alkylsulfonyl)amidoalkyl methacrylate or acrylate having the following general formula:

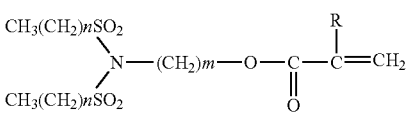

where n is an integer from 0 to 16; m is an integer from 1 to 5; R is a methyl group or hydrogen is mixed with a catalyst and transferred to a mold, subjected to elevated temperature for a time sufficient to polymerize the monomer; and thereafter the polymerized material is removed from said mold and optionally hydrated.

19. A copolymer plastic material which is manufactured:

(a) from about 1 to 60 weight percent of a monomer selected from the group consisting of bis(perfluoroalkylsulfonyl)amidoethyl ester monomer of acrylic or methacrylic acid, bis(alkylsulfonyl)amidoethyl ester monomer of acrylic and methacrylic acid and mixtures thereof;

(b) from about 1 to 50 weight percent of monomer selected from the group consisting of ethylenically unsaturated hydroxyalkyl monomer of acrylic or methacrylic acid and mixtures thereof (c) from about 5 to 65 weight percent organosilicone monomer;

(d) from 2 to 40 weight percent of unsaturated wettability monomer or mixtures thereof;

(e) from about 0.1 to 8 weight percent of acrylic or methacrylic acid or mixtures thereof;

(f) from about 0.1 to 10 weight percent of cross-linking agent monomer selected from the group consisting of ethyleneglycol dimethacrylate, diethyleneglycol dimethacrylate, triethyleneglycol dimethacrylate and tetraethyleneglycol dimethacrylate and mixtures thereof;

(g) from about 1 to 20 weight percent of alkyl or cyclic ester monomer of methacrylic acid and acrylic acid;

(h) from about 1 to 20 weight percent of perfluoroalkyl ester monomer of acrylic and methacrylic acid or mixtures thereof; and (i) from about 1 to 20 weight percent of additional cross-linking agent.

20. The plastic material of claim 19, wherein the additional cross-linking agent is selected from diisocyanates.

21. The plastic material of claim 19, wherein the additional cross-linking agent is at least one selected from the group consisting of 2-isocyanatoethyl methacrylate, 1,2 diisocyanatopropane, 1,4 diisocyanatobenzene, m-toluylene diisocyanate, and 1,5 diisocyanato 1-carboxypentane.

22. A method of forming an opthalmic device comprising:

(a) molding a copolymer plastic material from at least one of the following monomers:

(1) Bis(perfluoroalkylsulfonyl)amidoalkylmethacrylate having the following general formula:

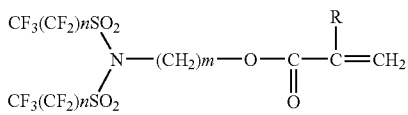

where n is an integer from 0 to 16; m is an integer from 1 to 5; R is a methyl group or hydrogen;

(2) (N-perfluoroalkylsulfonyl-N'-methylsulfonyl)amidoalkyl methacrylate having the following general formula:

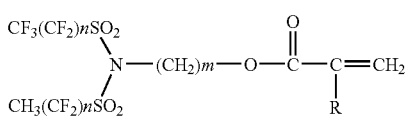

where n is an integer from 0 to 16; m is an integer from 1 to 5; R is a methyl group or hydrogen;

(3) (Bis(methylsulfonyl)amidoalkyl methacrylate having the following general formula:

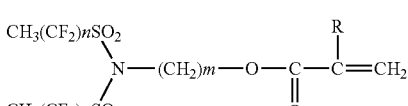

wherein n is an integer from 0 to 16; m is an integer from 1 to 5 and R is a methyl group or hydrogen:

(b) curing said copolymer plastic.

23. The method of claim 22, further comprising adding to said copolymer plastic material at least one organosilicone monomer prior to said molding.

24. The method of claim 23, wherein said organosilicone monomer is at least one selected from the group consisting of:

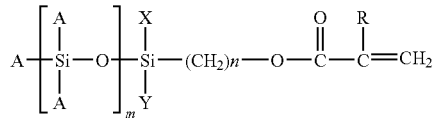
(I-Si)

wherein X and Y are $C_1$ to $C_6$, alkyl, cyclic or phenyl groups and/or groups of the following structures:

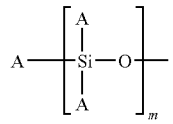

m being an integer from 1 to 6, n being an integer from 1 to 3, A is selected from $C_1$ to $C_6$, alkyl or phenyl groups, and R is a methyl group or hydrogen;

a group of organosiloxanylalkyl ester monomers of acrylic and methacrylic acid represented by the following formula:

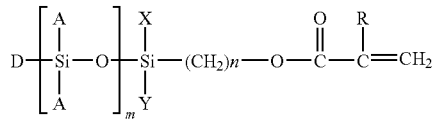
(II-Si)

wherein, X and Y are $C_1$ to $C_6$, alkyl or phenyl groups or groups of the following structure:

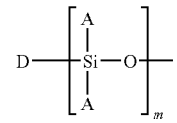

m being an integer from 1 to 6, n being an integer from 1 to 3, A is selected from $C_1$ to $C_6$, alkyl or phenyl groups, R is a methyl group or hydrogen and D is hydrogen or hydroxy group; and a group of organosiloxanylalkyl ester monomers of acrylic and methacrylic acids represented by the following structural formula:

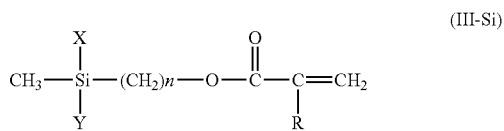
(III-Si)

wherein X and Y are groups of the following structure:

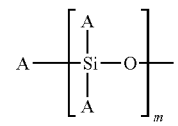

m being an integer from 1 to 5, n is an integer from 1 to 3, wherein, A is selected from $C_1$ to $C_6$, alkyl, cyclic or phenyl groups and R is a methyl group or hydrogen.

25. The method of claim 22, further comprising shaping a contact lens from said copolymer plastic.

26. The method of claim 22, further comprising hydrating said copolymer plastic after said curing step.

27. A contact lens made by the process of claim 22.

28. An opthalmic device made by the process of claim 22.

* * * * *